United States Patent [19]

Knauff

[11] Patent Number: 4,958,143
[45] Date of Patent: Sep. 18, 1990

[54] SYNCHRONIZED PULSE-ENHANCED DUAL LIGHT SOURCE

[76] Inventor: Robert J. Knauff, Markethouse, Suite 405, 289 E. 5th St., St. Paul, Minn. 55101

[21] Appl. No.: 317,648

[22] Filed: Mar. 1, 1989

[51] Int. Cl.$^5$ .................................................. B60Q 1/44
[52] U.S. Cl. .................................... 340/479; 340/331; 315/178; 315/182; 315/232
[58] Field of Search ............... 340/479, 469, 468, 331, 340/332, 467; 362/263, 61, 240, 276; 315/178, 182, 228, 232, 312

[56] References Cited

U.S. PATENT DOCUMENTS

| | | | |
|---|---|---|---|
| 3,519,984 | 7/1970 | Zychal | 340/331 X |
| 4,011,541 | 3/1977 | Fabry et al. | 340/331 X |
| 4,042,919 | 8/1977 | Patty | 340/331 X |
| 4,047,076 | 9/1977 | McNamara, Jr. | 315/182 X |
| 4,124,842 | 11/1978 | Bachelor | 340/331 X |
| 4,480,211 | 10/1984 | Eggers | 340/331 X |
| 4,550,305 | 10/1985 | Bookbinder | 340/479 |
| 4,791,399 | 12/1988 | Flannagan et al. | 340/479 |

OTHER PUBLICATIONS

"RCA Silicon Power Circuits Manual" (1975), pp. 147-148.

"Tomar Electronics, Strobe Light and Alarm Application Guide" (1988), pp. 13-14, 31-33.
"Power Conversion", RCA Silicon Power Circuits Manual, pp. 149-161 (1975).

Primary Examiner—Joseph A. Orsino
Assistant Examiner—Brian R. Tumm
Attorney, Agent, or Firm—Dorsey & Whitney

[57] ABSTRACT

An intermittent low intensity light source that is switched on by a drive signal is enhanced by a high intensity light source. The high intensity light source is coupled with the low intensity light source so that at least some light from both sources is projected in a desired direction. The high intensity light source has a brightness or intensity that significantly exceeds that of the low intensity light source. A pulse power source is connected to the high intensity light source and made responsive to the drive signal for pulsing the high intensity light source to emit a brief light pulse before the low intensity light source achieves any substantial precentage of its peak intensity, the light pulse occurring in such close time proximity to the peak intensity of the low intensity light source that persistence of vision in the human eye causes the two light sources blend together visually.

19 Claims, 4 Drawing Sheets

SYNCHRONIZED PULSE-ENHANCED DUAL LIGHT SOURCE

TECHNICAL FIELD

The present invention relates to light sources used for visual signaling. More particularly, the present invention relates to a light source with enhanced visibility due to a combination of synchronized high and low intensity light.

BACKGROUND ART

Light sources are widely used as signaling devices. Common examples are the brake or turning lights of vehicles, running lights on boats, snowmobiles or aircraft, the emergency lights of police vehicles and ambulances, and lights used on school buses to signal caution or require stopping. In all such uses, it is important that the light source have high visibility, such that even a driver or other person who is not directly attending to the vehicle or other object that is signaling will take note of the signal and fully recognize its significance. On the other hand, a light source used as a signal should not be so attention-getting that it is overly distracting or that it in any way impairs the vision of those that see it.

The most common light signaling sources used on vehicles are incandescent lights. Color and brightness are used to enhance visibility and to indicate certain kinds of signaling. Many light sources used for signaling emit no light until a signal is necessary. Some are simply turned on when the signal is desired and turned off when it is no longer desired. Others are turned on and off with a given frequency or reflected in a varying pattern. Still others change from a base level of light intensity to a somewhat higher intensity as the message to be signaled changes.

For several years ambulances and police vehicles have sometimes used flashing, high intensity, stroboscopic type lights to command attention. Similar high intensity lights are also used on aircraft or on high buildings. These can be quite effective, but their brightness at close range can be so intense that it distracts or is uncomfortable to observe. Accordingly, there is a need for a light source that can be used for signaling and that is both attention-getting and not unduly distruptive or uncomfortable for observers.

SUMMARY OF THE INVENTION

In accordance with the present invention, an intermittent low intensity light source that is switched on by a drive signal is enhanced by a synchronized high intensity light source. The high intensity light source is optically coupled with the low intensity light source so that at least some light from both sources is projected in a desired direction. The high intensity light source has an instantaneous peak brightness that significantly exceeds the peak brightness of the low intensity light source. A pulse power means is connected to the high intensity light source and made responsive to the drive signal for pulsing the high intensity light source to emit light for a brief period just before the low intensity light source reaches its full lumination. The sychronized high intensity light source pulse preferably is triggered substantially simultaneously with the initial delivery of power to the low intensity light source.

A primary objective of the present invention is to provide a light source that combines both high intensity light and low intensity light.

Another objective of the invention is to provide a means for enhancing the attention-getting qualities of a low intensity light source without causing undue distraction or discomfort to those that observe the light source.

A further objective of the present invention is to provide a means for enhancing a low intensity light source by preceding it with a synchronized, brief pulse of high intensity light and utilizing persistence of vision in the human eye to blend this pulse with the later appearance of the low intensity light.

A still further objective of the present invention is to provide a brake signalling light that illuminates faster than conventional incandescent lights and has improved visibility.

These and other objectives of the present invention will become apparent with reference to the drawings, the description of the preferred embodiment and the appended claims.

DESCRIPTION OF THE PREFERRED EMBODIMENT

Figure 1:
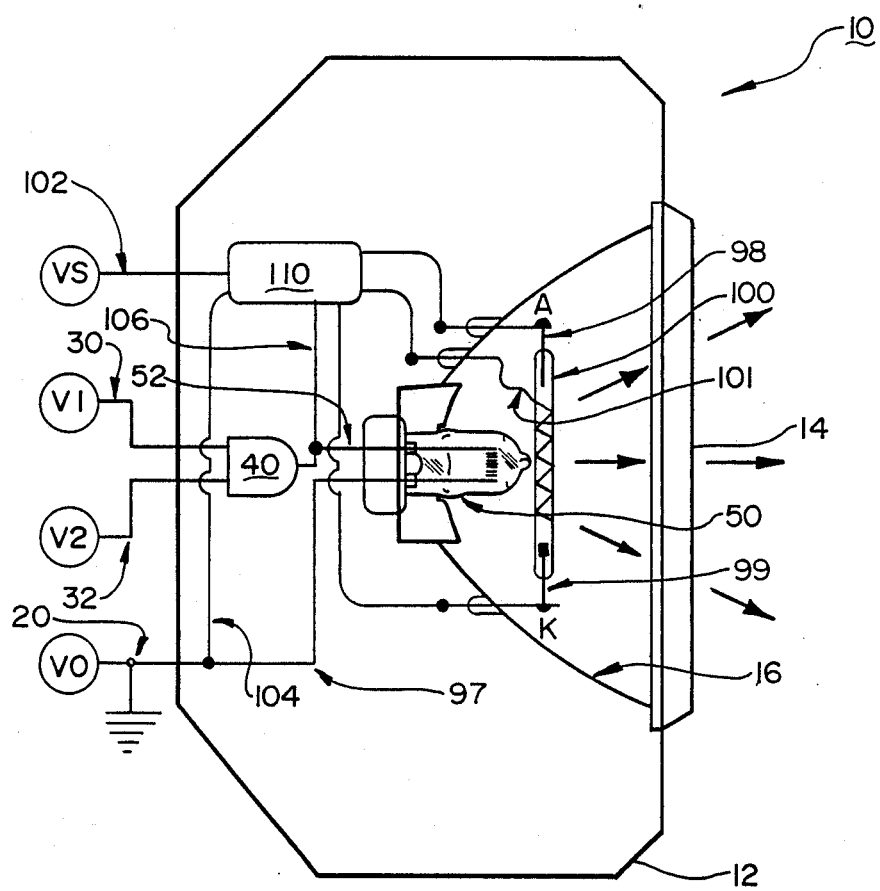
FIG. 1 is a schematic, block diagram of a pulse-enhanced light source according to the present invention.

As best seen in FIG. 1, a pulse-enhanced light source 10 in accordance with the present invention is preferably contained within a housing 12, having a lens 14 (which may be either clear, diffusing or tinted) through which light is emitted. Within the housing 12 are, in the preferred embodiment, an incandescent light source 50, which emits light of relatively low intensity, and a flash tube 100 or other high-speed, high intensity light source, such as a xenon-filled flash tube, that can deliver a short pulse of high intensity light very quickly after triggering. In the preferred embodiment the two light sources 50, 100 are optically coupled by being placed in close physical proximity within a parabolic reflector 16. The reflector 16 and the proximity of the light sources cause at least a portion (preferably, the major portion) of the light from the two sources 50, 100 to be projected in a desired direction through the lens 14 in such a way that an observer does not easily recognize that two different sources of light (radiant energy) are present.

Figure 5:
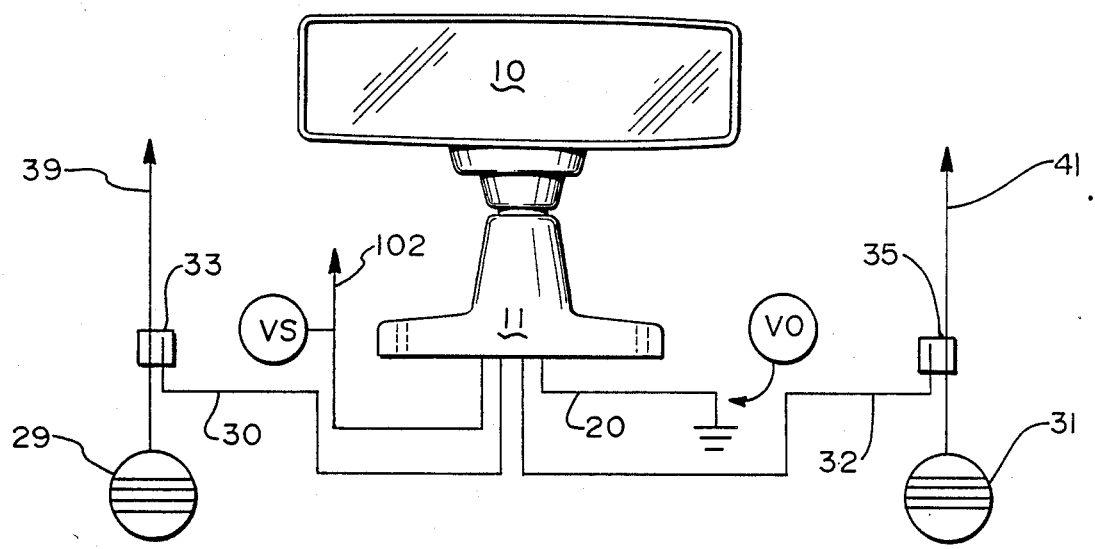
FIG. 5 is a schematic and pictorial diagram of a vehicle signalling light in accordance with the present invention

As will become evident from further explanation, the two light sources 50, 100 may be driven to emit light in a variety of ways and used in a variety of applications. By way of example, the invention will be further explained in the context of a pulse-enhanced light 10 used to signal vehicle braking, such as a high-mount brake light mounted on a base 11. FIG. 5 shows the general operating environment for such a pulse-enhanced light 10, including a left and a right brake light 29, 31, respectively, each of which has a power lead 39, 41, respectively, connected to it and providing a power signal for illumination. Each light 29, 31 also has an associated connector 33, 35, respectively, that provides an electrical connection between power leads 39, 41 and corresponding lines 30, 32 leading to light 10. Light 10 also has voltage supply line 102 and ground line 20 connected to it.

In this light signalling application, to draw attention to the act of braking, it is desired that the pulse enhanced light source 10 be triggered by the simultaneous activation of both brake lights 29, 31. (This prevents undesired signaling in nonbraking situations in vehicles that use the same lights to signal turning and braking, because a turn signal activates only one brake light and would not trigger pulse-enhanced light). Accordingly, the diagram of FIG. 1 shows voltage signals $V_1$ and $V_2$, each from one brake light, which are present on lines 30 and 32, connected to an AND logic element 40. The output on line 52 from the AND logic element 40 is a drive signal delivered to one side of the filament of low intensity, incandescent light source 50. The other side of the filament of the light source 50 is connected to line 54, which, in turn, is connected to $V_O$. $V_O$ is the system ground voltage level and appears on line 20.

The high intensity light source 100 is controlled and powered by drive circuit 110. One of the input voltages to drive circuit 110 is the output of AND circuit 40, carried to drive circuit 110 on line 106. The second input to drive circuit 110 is supply voltage $V_S$ on line 102, which is derived from the twelve volt vehicle battery (or other voltage supply) via the ignition switch or trunk lights. Drive circuit 110 is also connected to the circuit ground by line 104, which connects to line 20. As can be seen, the same voltage delivered to start driving the low-intensity light source 50 is also delivered to trigger the drive circuit 110 for the high intensity light.

Because the AND logic element 40 and the drive circuit 110 for the high intensity light source 100 are connected to the high and low intensitylight sources 50, 100 and cooperate together as the circuitry to drive the low and high intensity light sources 50, 100, they are sometimes hereinafter referred to as the drive means.

Figure 2:
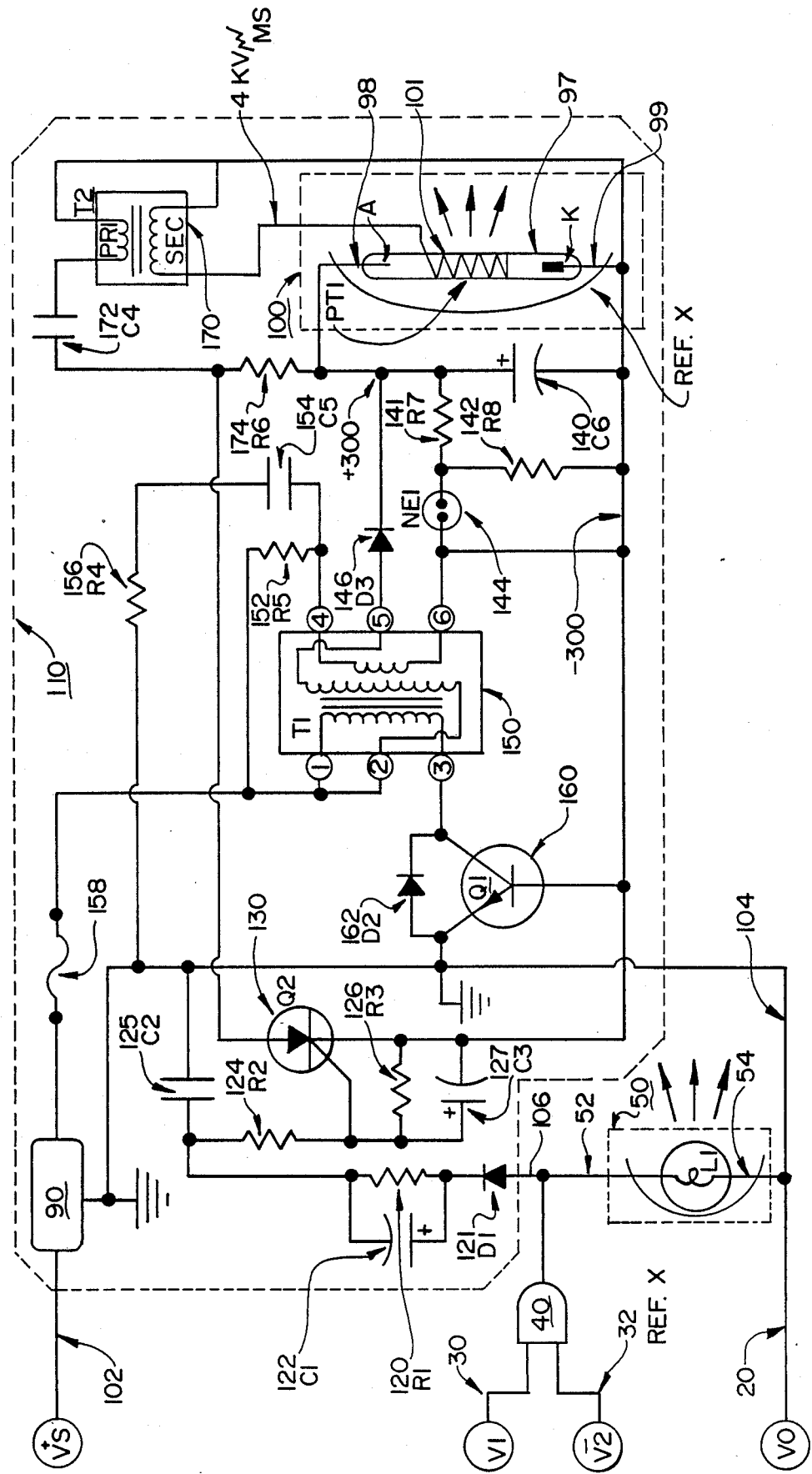
FIG. 2 is an electrical schematic of the circuitry used to drive the high and low intensity light sources involved in the present invention.

The schematic diagram of FIG. 2 shows the details of the circuit shown in block diagram form in FIG. 1. Of primary interest is the circuitry contained in drive circuit 110, which supplies the voltage to the high intensity light source, 100 (FT1). In general terms, the drive circuit 110 is a "ringing choke" oscillator that converts $V_S$ (12 volts) to the much higher voltage levels needed to drive the high intensity light source 100, combined with a trigger mechanism to initiate a high intensity light pulse.

In the specific example described, the high intensity light source 100 is a gaseous arc chamber light source, specifically a xenon-filled photoflash tube with a glass envelope 97 such as the Model AKL3519, made by Amglo Corporation of Bensonville, Illinois. The incandescent light is a 12 volt slide base lamp such as a GE 921 made by General Electric Corporation of Cleveland, Ohio or equivalent.

In overview, the circuitry of FIG. 2 may be considered as comprising three functional blocks: the trigger circuitry for SCR 130 (Q2); the maintenance voltage circuitry for keeping the 300 volt maintenance voltage across photoflash tube 100; and the high voltage trigger ionization pulse circuitry for delivering the 2000 to 4000 volt ionization voltage to photoflash tube 100.

The trigger circuitry for SCR 130 comprises blocking diode 121 (D1) that receives as a trigger signal the output from AND circuit 40 and delivers it via parallel coupled resistor 120 (R1) and capacitor 122 (C1) to resistor 124 (R2). (Capacitor 122 will be discharged when a triggering cycle starts. After charging, capacitor 122 helps to block further false trigger signals from the SCR 130 until the brake lights are switched off.) Capacitor 125 (C2) is used to filter out noise to minimize false triggering. Resistor 126 (R3) and parallel capacitor 127 (C3) are used to create a short "switch bounce" delay in turning on SCR 130 to ensure that a true trigger signal from the brakes is present, as well as to provide a reverse bias to the gate of SCR 130.

The 300 volt maintenance voltage for photoflash tube 100 is supplied by capacitor 140 (C6) connected in parallel with photoflash tube 100. Resistors 141, 142 (R7, R8) are connected in series to form a voltage divider/bleeder network and are also in parallel with capacitor 140. Neon 300 volt charge indicator light 144 (NE1) is in parallel with resistor 142. Transistor 160 (Q1) connected to rectifier 162 (D2) and resistors 152, 156 (R5, R4) and capacitor 154 (C5) are part of the oscillator circuit that provides pulsed DC power to the primary side of transformer 150 (T1) (between pins 1 and 3). The secondary side of transformer 150 (between pins 2 and 5) is connected to rectifier 146 (D3), which connects to capacitor 140 and to the anode lead 98 of the photoflash tube 100. This is a conventional ringing-choke DC-to-DC converter, such as described in "Power Conversion," RCA Silicon Power Circuits Manual, p. 147–161, (1975) which is incorporated herein by reference.

The high voltage trigger pulse for photoflash tube 100 is provided by transformer 170 (T2). The primary coil of transformer 170 is coupled to SCR 130 via capacitor 172 (C4), which is also connected to capacitor 140 via charging resistor 174 (R6). The secondary side of transformer 170 is connected to the cathode lead 99 and the trigger element 101 of the photoflash tube 100. Capacitor 172 is charged by the same circuit that charges capacitor 140.

The preferred values and specifications for the circuit elements of a 5 volt circuit are as follows:

| Capacitors | |
|---|---|
| C1, C3 | 1 MFD/50 WVDC (electrolytic) |
| C2 | .1 MFD/100 WVDC (disc) |
| C4 | .25 MFD/400 WVCD (disc) |
| C5 | .002 MFD/100 WVDC (disc) |
| C6 | 200 MFD at 330 to 350 WVDC (electrolytic photoflash type) |
| Resistors (all ¼ watt) | |
| R1 | 47K ohms |
| R2, R3 | 1K ohms |
| R4 | 8.2 ohms |
| R5 | 12K ohms |
| R6 | 1M ohms |
| R7 | 82K ohms |
| R8 | 3.3M ohms |
| Transistors, Diodes, Rectifiers | |
| Q1 | D826 (NPN) HFE 190 to 240 |
| Q2 | 1 Amp, SCR 400 WVDC |
| D1 | 1N914/75 ma/50 PIV |
| D2 | 1N4001/1 amp/100 PIV |

| | |
|---|---|
| D3 | 1N4004/1 amp/400 PIV |

These element values yield the voltage and current values and timing discussed below.

Figure 3:
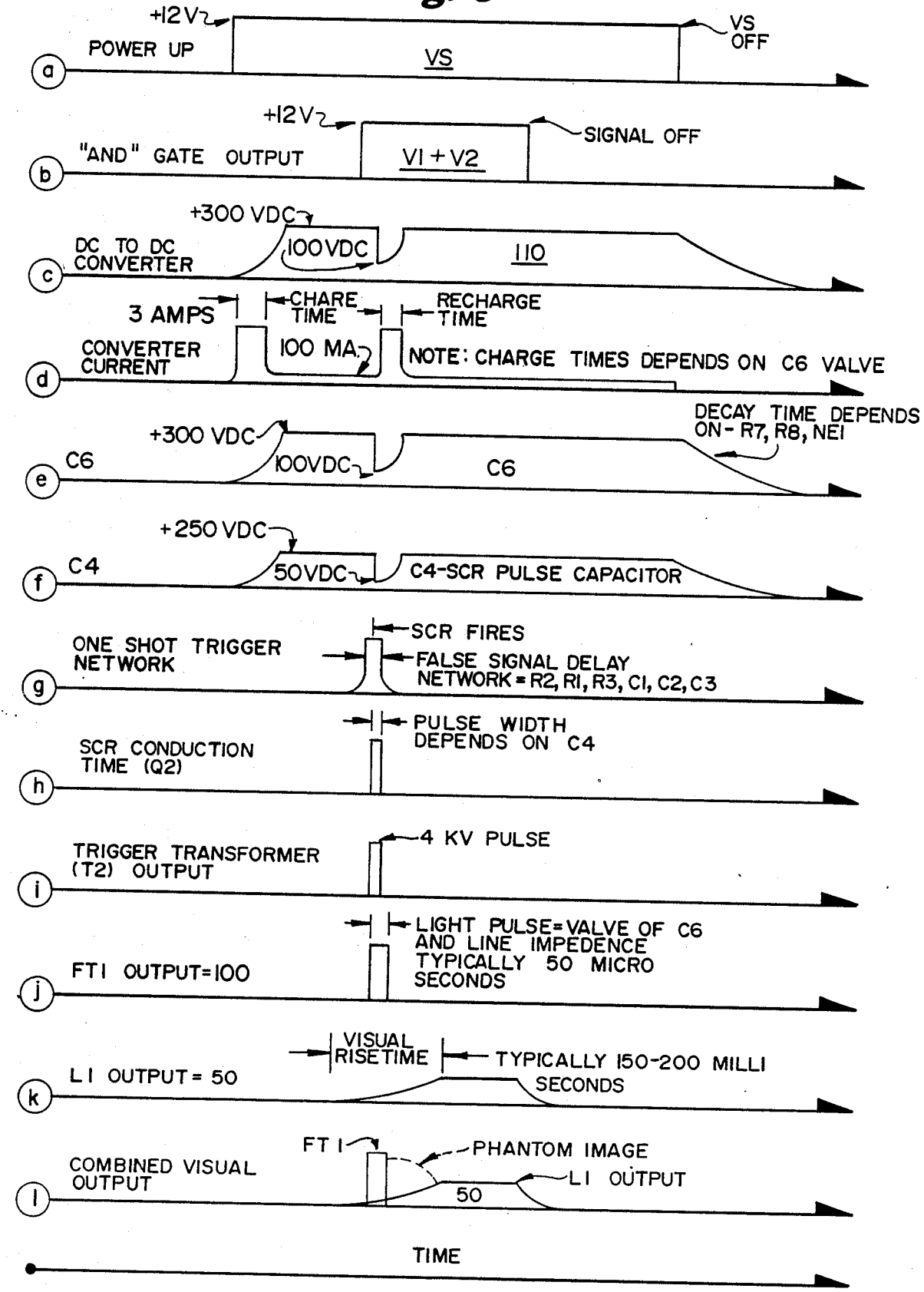
FIG. 3 is a timing diagram that shows the voltage and current values at various points in the circuitry of FIG. 2 and the actual and preceived light output of the high and low intensity light sources as the invention powers up, delivers pulse-enhanced light and powers down.

Referring now to FIG. 2 and FIG. 3, the operation of the circuit can be explained. When the circuit is first powered up (when the vehicle ignition is turned on), the DC current delivered via voltage regulator 90 (which reduces 12 volts to 5 volts), fuse 158 and the primary coil (between pins 1 and 3) of transformer 150 is chopped into pulsed DC current that drives the secondary coil (between pins 2 and 5) of transformer 150. The feedback leading to oscillation is provided via the base feedback coil (between pins 4 and 6), capacitor 154 and resistor 156. The secondary coil of transformer 150 supplies a charging voltage of about 300 volts to capacitor 140. When capacitor 140 is fully charged, the neon indicator tube 144 glows. Capacitor 172 also charges from the secondary coil, to about 250 volts. Transistor 160 turns on and off during this charging cycle in the usual manner of a ringing choke converter circuit. While transistor 160 carries about three amps (peak) of current during the charging cycle, it settles to a maintenance current of about 100 ma thereafter, until it is discharged in a power pulse delivered to photoflash tube 100.

When AND block 40 receives simultaneous signals from both brake lights (lines 30, 32), it produces an output on lines 52 and 106. This causes the low intensity light source 50 (L1) to begin to heat up and move toward incandescence. It is significant that full incandescence and full light output is not reached for about 150–200 milliseconds or more, because of the filament heating time. The output on line 106 acts as a trigger for SCR 130, which begins to conduct after the false signal delay network of capacitors 125, 127 and resistors 124, 126 has satisfied its delay requirement of about 25 to 50 milliseconds. The conduction state of SCR 130 permits capacitor 172 to discharge, causing a rapid, sharp change in the voltage in the primary of transformer 170 and a corresponding change in the secondary voltage, which delivers a pulse of about 4000 volts to the trigger element 101 of photoflash tube 100. Capacitor 140 then discharges into the photoflash tube 100. This causes the gas in photoflash tube 100 to ionize and emit a flash of light of about 50 microseconds duration, while the low intensity light source 50 continues to move toward its peak light output, which it holds until the brake lights are turned off.

The duration of the conduction period for SCR 130 depends primarily on the value of capacitor 172, which dumps its charge through the SCR 130. The duration of the light pulse from high intensity light source 100 depends primarily on its operating specifications (including impedance) and the value of capacitor 140. Accordingly, by selection of other components a somewhat longer or shorter light pulse than 50 microseconds can be obtained. The duration will, however, always remain in the microsecond range. The delay between the time a signal appears on line 106 and when the photoflash tube 100 starts its short (approximately 50 microsecond) pulse of light depends on the values of the elements in the false signal delay network and other circuit components, but it is kept small, so that photoflash tube 100 reaches its peak light output and is turned off before low intensity light source 50 has achieved any substantial percentage of light output (e.g., 30–50 percent).

This relative timing and the difference in peak intensities of the two lights has three primary purposes. First, because the light from photoflash tube 100 becomes visible before the light from the low intensity light source 50, an observer of the pulse enhanced light source can begin his reaction cycle more quickly. That is, the delay between the time the driver of a car having pulse-enhanced brake lights decides to brake, moves his foot to the brake pedal and activates the brake light system and the time a light signal becomes visible to other drivers is shortened. The photoflash tube 100 can deliver its light more quickly, because it need not heat to incandescence. Second, the light from the photoflash tube 100, although brief, is very intense. Although such light is hard to measure precisely, it probably corresponds to several hundred thousand lumens at a brief peak, as compared to a few hundred lumens for the steady output of a standard incandescent brake light of about 20–40 watts. This intense light is highly visible and is registered even in peripheral vision. Third, the light from photoflash tube 100 is bright enough that it leaves an image that persists strongly in the human vision system. This persistent image then blends with the lower intensity image that emerges milliseconds later from the low intensity light source 50, which has now reached full incandescence and its peak light output. The eye perceives a blended image caused by both lights, but this image feels a bit unusual, because of the brief period before incandescence when a "phantom image" dominates in the human vision system by reason of persistence of vision.

FIG. 3 shows a horizontal time-line diagram for power-up, one triggering of the light sources 50, 100 and power-down, as these steps affect various components of the circuit of FIG. 2. Voltage and current values are displayed on the vertical scales for FIGS. 3(a) through 3(i). FIGS. 3(j) to 3(l) show schematically the light output of light sources 50, 100, individually and optically combined or blended, as this output would be measured by very high speed instrumentation and seen by the somewhat slower-reacting vision system of an observer. (The relative output intensity and duration of the high and low intensity light sources are not to scale.) The broken line in FIG. 3(l) attempts to portray the "phantom image" and show how persistence of vision would cause light from the two separate light sources 50, 100 to blend together. (Precise measurement of this effect is quite difficult and subjective in nature.) The various time-line diagrams are as follows:

FIG. 3(a)—ignition power on for extended period and then off;

FIG. 3(i)—brake lights with power on and then off (output of AND

FIG. 3(c)—output of voltage converter

FIG. 3(d)—charging current for capacitors 140, 172

FIG. 3(e)—charging and discharge voltage at capacitor 140

FIG. 3(f)—charging and discharge voltage at capacitor 172

FIG. 3(g)—voltage wave form at SCR false signal delay network

FIG. 3(h)—conduction period for SCR trigger

FIG. 3(i)—voltage at trigger transformer 170

FIG. 3(j)—optical output of flash tube 100

FIG. 3(k)—optical output of incandescent light source 50

FIG. 3(l)—combined optical output of FIGS. 3(j) & 3(k), with dotted line showing "phantom image" effect of persistence of vision.

As can be seen from FIG. 3(l), the invention involves combining or blending of two disparate intensities of light. The image observed by a viewer begins with a pulse of high intensity light from photoflash tube 100 that is emitted for about 50 microseconds, then stops, while the low-intensity incandescent light continues to grow toward its peak output, which it holds until the brake lights themselves are turned off. The high intensity light pulse is of a magnitude and occurs in such close time proximity to the peak intensity of the low intensity light source that persistence of vision in the human eye causes the two light sources to blend together visually, bridged by a "phantom image". The high intensity light pulse will capture a viewer's attention even if it is only seen in peripheral vision. In addition, its brightness causes it to persist in the viewer's eye and brain vision system as a "phantom image" after the photoflash tube 100 has actually ceased to emit its light pulse. (The human vision system is known to process light stimulation in time frames of about 100 milliseconds.) The low intensity light is viewed by normal vision and continues after the viewer's attention has been directed to the combined light source. The exact duration and intensity of the light sources are selected for the particular application. In almost all cases the peak instantaneous intensity of light from the high intensity light pulse will be in the range of at least one order of magnitude greater than the intensity of the low intensity light source 50. The high intensity light pulse will also have a duration of microseconds only, while the low intensity light source will remain on typically for a minimum of 500 milliseconds.

Although FIG. 1 shows optical coupling of light sources contained in different envelopes via reflector 16, it is possible to place the incandescent filament and the ionizing gas with their related electrodes and leads within a single envelope, such as a single glass bulb. The incandescent filament would then serve both as the low intensity light source and as the cathode of the high intensity light source. This form of optical coupling would place the two light sources in such close proximity that optical coupling via a reflector would be easier and the blended light could be projected in an almost spherical pattern, rather than in the more narrowly directed pattern of a reflector.

Figure 4:
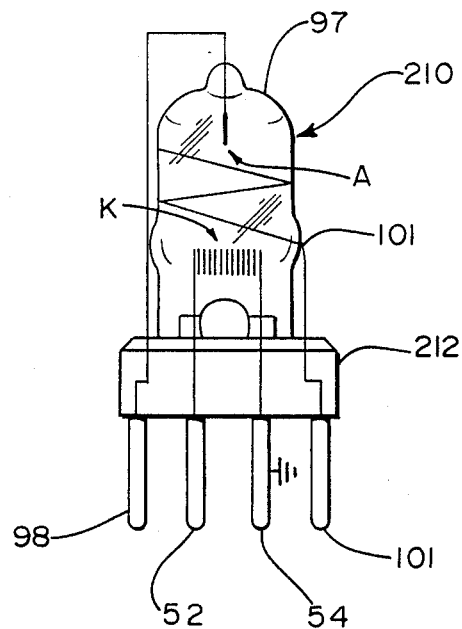
FIG. 4 is pictorial diagram of an alternative embodiment for a dual source light for use with the present invention.

FIG. 4 shows a pictorial diagram of a light source 210 in which the electrodes for the high and low intensity lights are all associated with one envelope 97. In this light source 210 the base 212 supports an incandescent filament connected to leads 52, 54. This filament also serves as the cathode for the high intensity light source. The anode is connected to anode lead 98, while the trigger 101 takes the form of a wrapping (or silver ink coating) on the outside surface of the glass envelope 97. This light source 210 could be used in the circuitry shown in FIG. 2 and would have advantages in compactness as well as efficiency in light projection.

It will be seen that the preferred embodiment described above is just one application of the invention and that many other variations are possible. These include:

1. The intensity of the low intensity light source relative to the high intensity light source may be greater or less; in particular, the intensity of either may be varied according to ambient light and the need to be noticed in brighter or darker ambient light. (Typically the ratio at peak output of the high to low intensity sources will be ten or more to one).
2. The low intensity light and high intensity light may be essentially the same spectra or of different colors (wavelengths).
3. The relative time duration of the low intensity and high intensity lights may be varied, as long as there is a brief period when the persistence of vision image from the high intensity light is stronger than any image produced by the low intensity light, still not operating at its peak intensity. These variations permit the invention to be "tuned" to fit a particular application, where ambient light or the limits of the low intensity light source help determine the relative intensity and duration of the high intensity light pulse.
4. The optical coupling may be achieved by simple physical proximity of the two light sources for a more spherical projection of light or by various available optical piping means.

It will also be seen that while the circuitry of FIG. 2 includes only one coupled pair of high and low intensity lights, the same circuitry could be used to drive two or more such coupled pairs with appropriate changes to increase available power. With switching of the output among various coupled pairs of light sources, sequential, alternating or other patterns of pulse-enhanced light may be created. Thus, the present invention could provide a useful alternative to the standard light bars or the red-yellow or blue flashing lights common on police cars.

In view of the many available variations, it is intended that the scope of the present invention be dictated by the appended claims rather than by the description of the preferred and alternate embodiments.

What is claimed and desired to be protected by Letters Patent is:

1. Apparatus for enhancing an intermittent low intensity light source that is powered by a drive signal comprising:
    a. a high intensity light source optically coupled with said low intensity light source so that at least some light from both sources is projected in a desired direction, said high intensity light having an instantaneous intensity that significantly exceeds the peak intensity of the low intensity light source; and
    b. pulse means connected to said high intensity light source and responsive to said drive signal for pulsing said high intensity light source to produce a light pulse before the low intensity light source achieves any substantial percentage of its peak intensity, said light pulse occurring in such close time proximity to the peak intensity of the low intensity light source that persistence of vision in the human eye causes the two light sources to blend together visually.

2. The apparatus as recited in claim 1 wherein the pulse means comprises:
    sensing means for sensing the presence of the drive signal;
    storage means for maintaining and delivering an electric charge sufficient to drive said high intensity light source for a pulse period; and
    trigger means operably connected to said sensing means and said storage means for initiating delivery of said electric charge to said high intensity light source upon sensing the initial presence of the drive signal.

3. A pulse-enhanced intermittent dual light source that is switched on by a drive signal comprising:
   a. a first, low intensity light source operably coupled to said drive signal;
   b. a second, high intensity light source optically coupled with said low intensity light source to project light in substantially the same direction as at least some light projected from said low intensity light source; and
   c. pulse means connected to said high intensity light source and responsive to said drive signal for pulsing said high intensity light source to produce a light pulse before the low intensity light source achieves any substantial percentage of its peak intensity, said light pulse occurring in such close time proximity to the peak intensity of the low intensity light source that persistence of vision in the human eye causes the two light sources to blend together visually.

4. The light source as recited in claim 3 wherein the first and second light sources are optically coupled by a common reflector element.

5. The light source as recited in claim 3 wherein the first and second light sources are in a common envelope.

6. The light source as recited in claim 3 wherein the low intensity light source is an incandescent light source and the high intensity light source is a gaseous arc chamber light source 7. The light source as recited in claim 6 wherein said gaseous arc chamber light source is an ionized gas flashtube.

8. The light source as recited in claim 3 wherein the drive signal is a signal derived from vehicle signalling lights.

9. The light source as recited in claim 8 wherein the vehicle signalling lights are vehicle brake lights.

10. An enhanced dual light source comprising:
    a first, low intensity light source;
    a second, high intensity light source optically coupled with said low intensity light source so that at least some light from both sources is projected in a desired direction; and
    drive means operably coupled to said first and second light sources for stimulating the emission of a pulse of light from said second light source during a period when the first light source is also being stimulated to emit light but before said first light source reaches any substantial percentage of its peak intensity, said light pulse occurring in such close time proximity to the peak intensity of the low intensity light source that persistence of vision in the human eye causes the two light sources to blend together visually.

11. The enhanced light source of claim 10 wherein the drive means is operably coupled to said first and second light sources to stimulate the emission of said light pulse from said second light source in response to the same signal that powers the first light source.

12. A method of producing a pulse-enhanced light signal comprising:
    a. stimulating light from a first, low intensity light source;
    b. stimulating a pulse of light from a second, high intensity light source, where such pulse-stimulation causes a light pulse with a duration in the microsecond range, said light pulse being emitted before the first, low intensity light source achieves any substantial percentage of its peak value and occurring in such close proximity to the peak intensity of the low intensity light source that persistence of vision in the human eye causes the two light sources to blend together visually; and
    c. optically coupling said light from said first and second, low and high intensity light sources such that at least some light from both sources is projected in a desired direction.

13. A pulse-enhanced intermittent dual light source that is switched on by a drive signal comprising:
    a. a first, low intensity light source operably coupled to said drive signal;
    b. a second, high intensity light source optically coupled with said low intensity light source to project light in substantially the same direction as at least some light projected from said low intensity light source; and
    c. pulse means connected to said high intensity light source and responsive to said drive signal for pulsing said high intensity light source to initiate and complete a light pulse before the low intensity light source achieves any substantial percentage of its peak intensity, said light pulse occurring in such close time proximity to the peak intensity of the low intensity light source that persistence of vision in the human eye causes the two light sources to blend together visually.

14. The light source as recited in claim 13 wherein the first and second light sources are optically coupled by a common reflector element.

15. The light source as recited in claim 13 wherein the first and second light sources are in a common envelope.

16. The light source as recited in claim 13 wherein the low intensity light source is an incandescent light source and the high intensity light source is a gaseous arc chamber light source.

17. The light source as recited in claim 16 wherein the gaseous arc chamber light source is an ionized gas flashtube.

18. The light source as recited in claim 13 wherein the drive signal is a signal derived from vehicle signalling lights.

19. The light source as recited in claim 18 wherein the vehicle signalling lights are vehicle brake lights.

* * * * *